United States Patent
Wischmeyer et al.

(10) Patent No.: US 9,637,244 B2
(45) Date of Patent: May 2, 2017

(54) AIRCRAFT INSTRUMENTATION SYSTEMS FOR DISPLAYING ELECTRONIC CIRCUIT BREAKER INFORMATION

(71) Applicant: Gulfstream Aerospace Corporation, Savannah, GA (US)

(72) Inventors: Carl Edward Wischmeyer, Savannah, GA (US); Frank Manochio, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/869,508

(22) Filed: Sep. 29, 2015

(65) Prior Publication Data

US 2017/0088285 A1   Mar. 30, 2017

(51) Int. Cl.
  *G05D 1/00* (2006.01)
  *H02B 1/00* (2006.01)
  *B60L 1/00* (2006.01)
  *B64D 45/00* (2006.01)
  *B64D 43/00* (2006.01)

(52) U.S. Cl.
  CPC ............. *B64D 45/00* (2013.01); *B64D 43/00* (2013.01); *B64D 2045/0085* (2013.01)

(58) Field of Classification Search
  USPC .............................. 701/3; 361/600; 307/10.1
  See application file for complete search history.

(56) References Cited

U.S. PATENT DOCUMENTS

| | | | | |
|---|---|---|---|---|
| 2004/0228071 A1* | 11/2004 | Healy | .................... | H01H 71/04 361/600 |
| 2005/0154558 A1* | 7/2005 | Baum | .................... | G06F 17/509 702/182 |
| 2006/0108873 A1* | 5/2006 | Hamasaki | .............. | B64D 43/00 307/10.1 |
| 2009/0192659 A1* | 7/2009 | Beebe | ................. | G06F 11/0739 701/2 |

OTHER PUBLICATIONS

Honeywell, MD-11 Cockpit Pilot's Guide, front page photo, 1994.
Honeywell, MD-11 Cockpit Pilot's Guide, p. 2-83, 1994.

* cited by examiner

*Primary Examiner* — Tyler Paige
(74) *Attorney, Agent, or Firm* — Lorenz & Kopf, LLP (LKGlobal)

(57) ABSTRACT

Aircraft instrumentation systems and controllers are provided. An aircraft instrumentation system includes a display and a controller. The controller is configured to monitor an electronic circuit breaker (ECB) status of each of a plurality of aircraft systems. The controller is further configured to generate, for each of the plurality of aircraft systems, a visual indicator that indicates the ECB status. The controller is yet further configured to generate an image arrangement that includes the visual indicator for each of the plurality of aircraft systems and to generate a signal that causes a display to present the image arrangement.

19 Claims, 3 Drawing Sheets

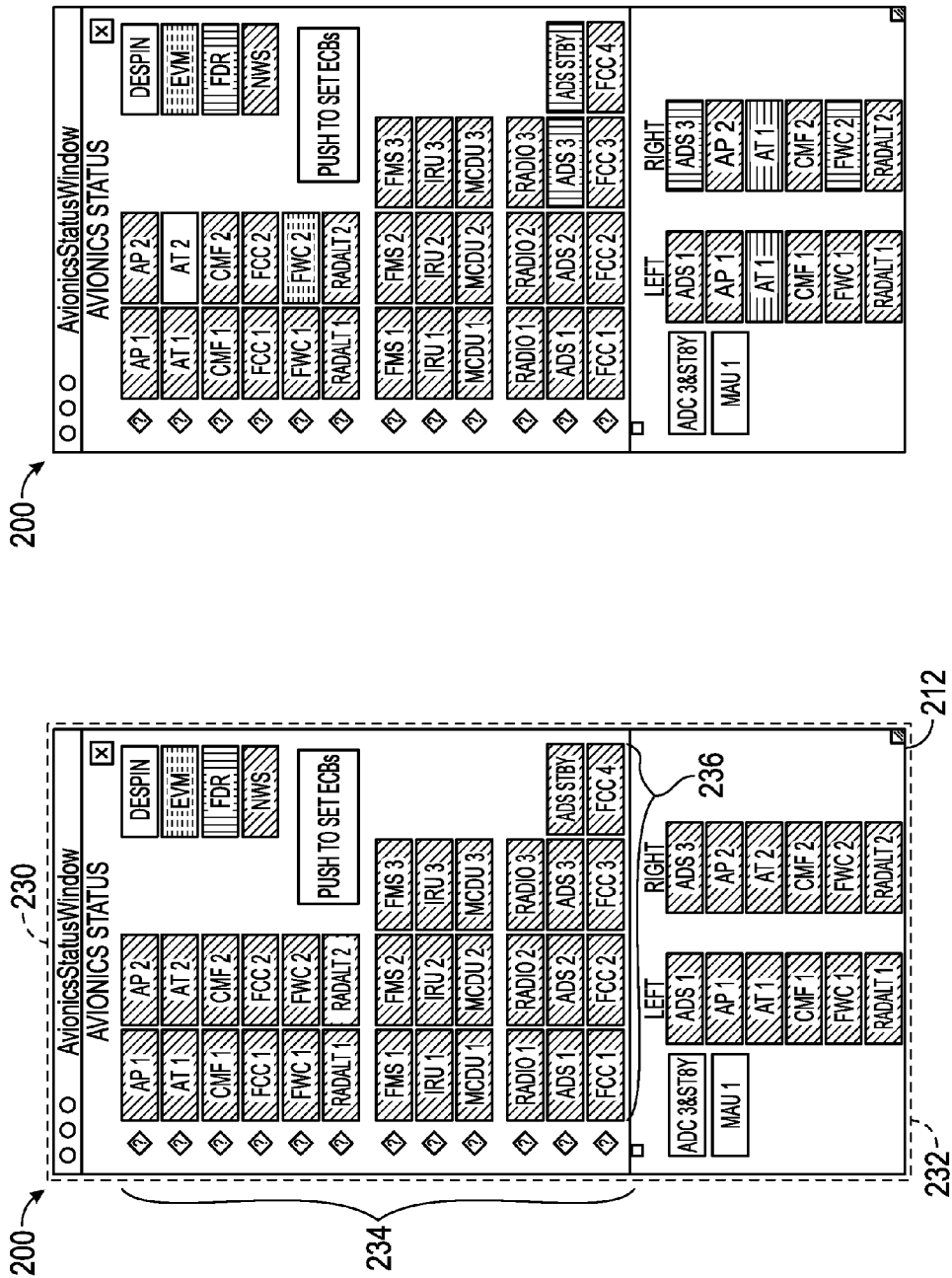

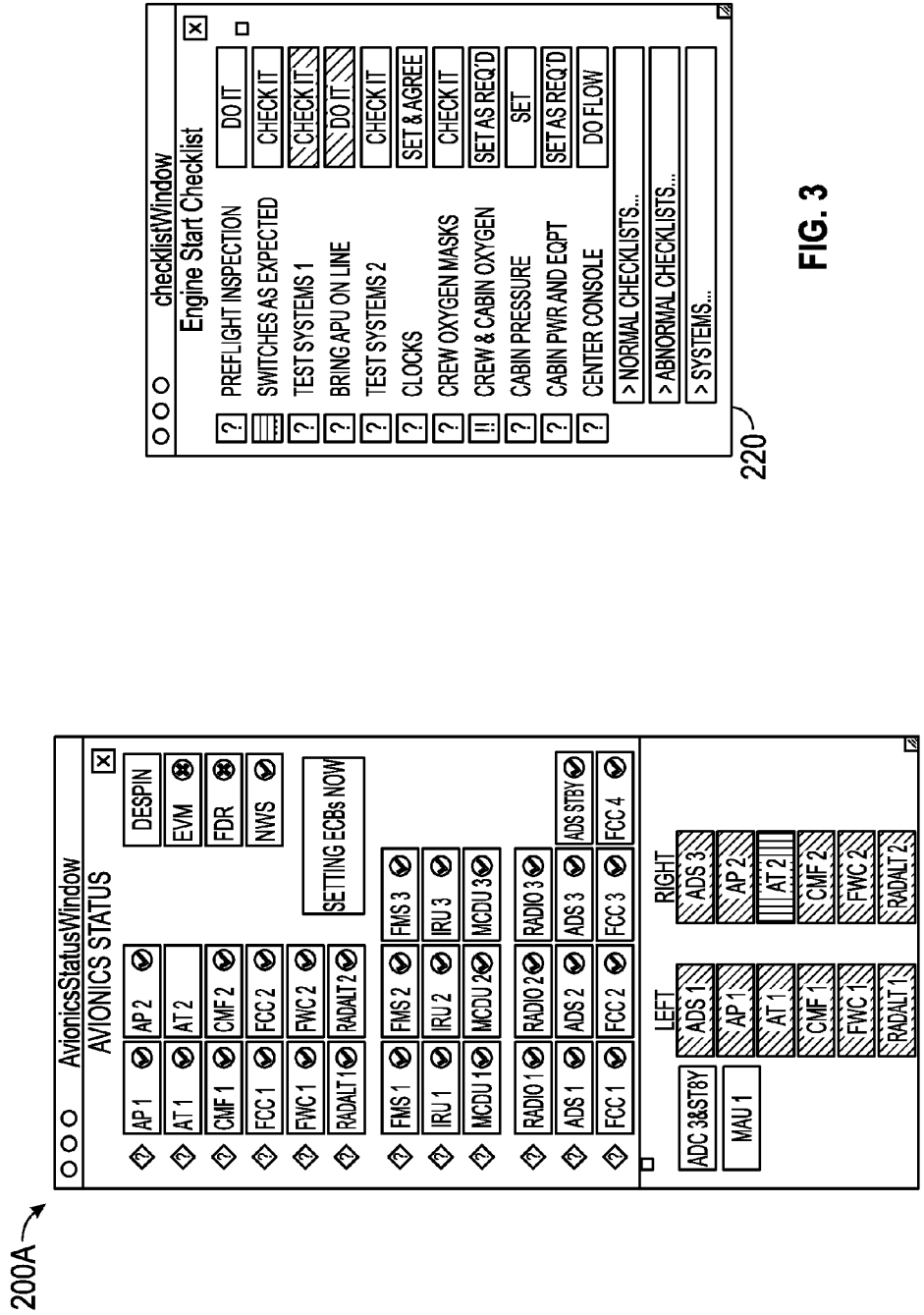

AIRCRAFT INSTRUMENTATION SYSTEMS FOR DISPLAYING ELECTRONIC CIRCUIT BREAKER INFORMATION

TECHNICAL FIELD

The technical field relates generally to aircraft instrumentation and control, and more particularly relates to aircraft instrumentation that presents electronic circuit breaker information in a systems window.

BACKGROUND

As modern aviation advances, the demand for ever-increasing flight envelopes and pilot performance grows. To help meet this demand on the aircraft and on the pilots, modern aircraft include impressive arrays of displays, instruments, and sensors designed to provide the pilot with menus, data, and graphical options intended to enhance pilot performance and overall safety of the aircraft and the passengers. Although current displays systems and methods are suitable for their intended purpose, the need for efficient arrangement of displays and information is essentially ever present.

As such, it is desirable to provide systems, aircraft, and methods with efficient arrangement of displays and information. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of aircraft, instrumentation systems, and media are disclosed herein.

In a first non-limiting embodiment, a controller includes, but is not limited to, a processor and an electronic memory unit communicatively coupled with the processor. The electronic memory unit stores instructions that when executed by the processor enable the controller to monitor an electronic circuit breaker (ECB) status of each of a plurality of aircraft systems. The controller is further configured to generate, for each of the plurality of aircraft systems, a visual indicator that indicates the ECB status. The controller is yet further configured to generate an image arrangement that includes the visual indicator for each of the plurality of aircraft systems and to generate a signal that causes a display to present the image arrangement. In a second non-limiting embodiment, an instrumentation system includes, but is not limited to, a display and a controller communicatively coupled with the display. The controller is configured to monitor an electronic circuit breaker (ECB) status of each of a plurality of avionics systems. The controller is further configured to generate, for each of the plurality of avionics systems, a visual indicator that indicates the ECB status, where each visual indicator is one of a "normal operation" visual indicator, a "tripped" visual indicator, a "pulled" visual indicator, and a "collared" visual indicator." The controller is yet further configured to generate an image arrangement that includes the visual indicator for each of the plurality of avionics systems and to generate a signal that causes a display to present the image arrangement.

In a third non-limiting embodiment, an instrumentation system for an aircraft includes, but is not limited to, a display and a controller communicatively coupled with the display. The controller is configured to monitor a current phase of flight in which the aircraft is currently operating. The controller is further configured to generate a checklist associated with a next consecutive phase of flight that follows the current phase of flight. The controller is yet further configured to generate a signal that causes the display to present the checklist associated with the next consecutive phase of flight in response to one of transitioning to, reaching a predetermined time until, and reaching a predetermined distance from the next consecutive phase of flight.

BRIEF DESCRIPTION OF THE DRAWINGS

Advantages of the present invention will be readily appreciated, as the same becomes better understood by reference to the following detailed description when considered in connection with the accompanying drawings wherein:

FIGS. 2A, 2B, 2C, and 3 illustrate image arrangements for the instrumentation system of FIG. 1 in accordance with teachings of the present disclosure.

DETAILED DESCRIPTION

Figure 1:
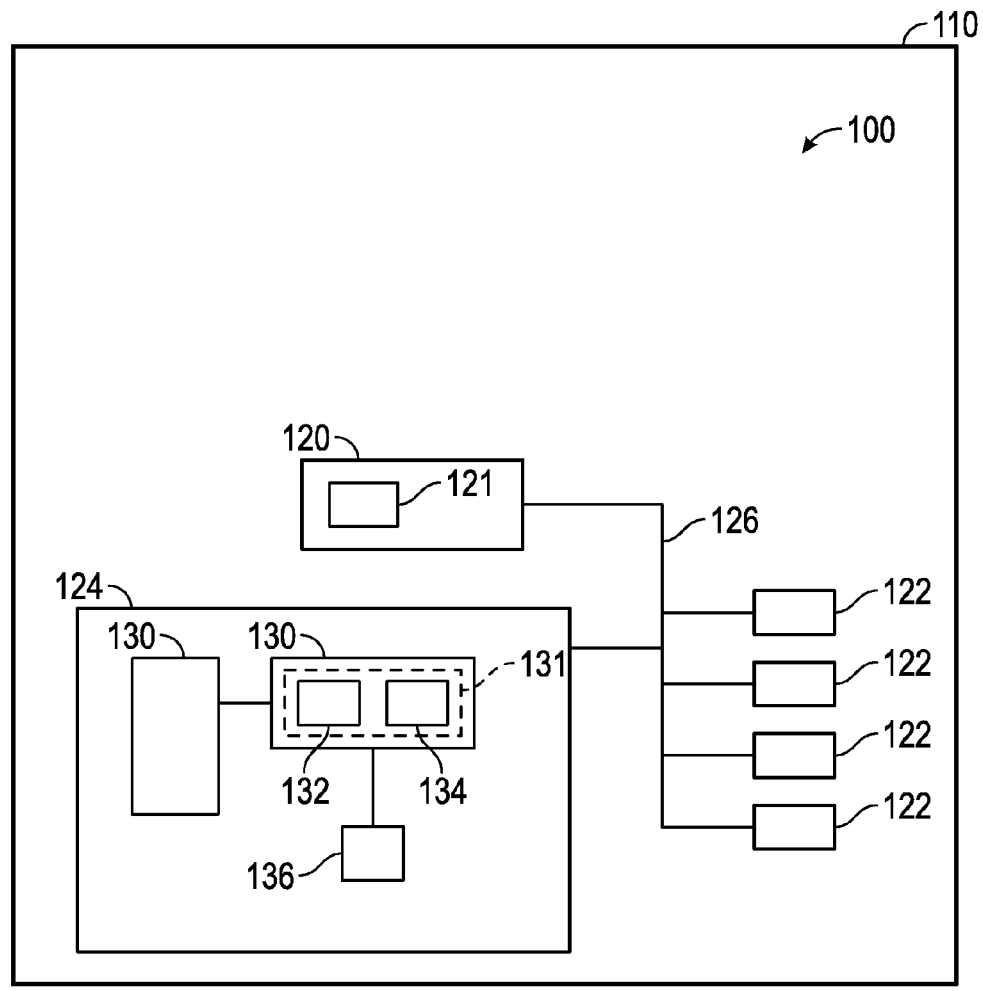
FIG. 1 illustrates an instrumentation system for an aircraft in accordance with teachings of the present disclosure.

The following detailed description is merely exemplary in nature and is not intended to limit application and uses. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computer system.

Referring now to FIG. 1, an example of an instrumentation system 100 for an aircraft is illustrated in accordance with some embodiments. In the embodiment provided, system 100 is located in an aircraft 110. In alternative embodiments, instrumentation system 100 may be located in other aircraft, land or water vehicles, or fixed-systems other than the aircraft 110. For example, the instrumentation system 100 may be located in a helicopter, a boat, a chemical plant, a factory, a power plant, or other types of complex machinery.

Instrumentation system 100 includes a controller 120, a plurality of aircraft components 122, and a user interface 124. An interconnect 126 electronically couples the controller 120, the aircraft components 122, and the user interface 124 for electronic communication. In the example provided, the interconnect 126 is a bus network, as will be appreciated by those with skill in the art. It should be appreciated that any suitable network topology or physical medium may be utilized for electronic communication in instrumentation system 100.

The controller 120 is a hardware device that carries out instructions of a computer program, as is well known to those skilled in the art. The controller 120 may be implemented with one or more central processing units ("CPUs"), a microprocessor, an application specific integrated circuit ("ASIC"), a microcontroller, and/or other suitable device. The controller 120 includes one or more memories 121 that store electronic data and computer programs. For example, the memories 121 may be flash memory, spin-transfer torque random access memory (STT-RAM), magnetic memory, phase-change memory (PCM), dynamic random access memory (DRAM), or other suitable electronic storage media. Furthermore, the controller 120 may utilize multiple hardware devices as is also appreciated by those skilled in the art.

The aircraft components 122 may be components that directly control flight of the aircraft 110, components that monitor flight status of the aircraft 110, or other components related to operations of the aircraft 110. For example, the aircraft components 122 may include batteries, an auxiliary power unit ("APU"), landing gear, flaps, brakes, electrical loads, engines, a fuel tank, and/or external lights. It should be appreciated that numerous other components 122 may be utilized in operation of aircraft 110.

Components 122 may send information, data, and/or commands to the controller 120, and vice-versa. For example, a component 122 may send position status or operational status to the controller 120, as will be appreciated by those with skill in the art.

User interface 124 sends information to, and receives user inputs from, pilots and crew of the aircraft 110. The user interface 124 includes displays 130, status indicators 131, and input devices 136. The displays 130 are electronic displays that are electronically coupled with the controller 120 to visually present information and data according to electronic signals generated by the controller 120. For example, the displays 130 may include cathode ray tubes ("CRT"), light-emitting diodes ("LED"), plasma panels, liquid crystal displays ("LCD"), projected images from a Digital Light Processing (DLP) projector, and/or any other suitable electronic display technology. Although described with reference to multiple displays 130, it should be appreciated that the user interface 124 may alternatively include a single display.

In the example provided, displays 130 include one or more primary flight displays 132 and one or more multi-function displays 134, as will be appreciated by those with skill in the art. Primary flight displays 132 and multi-function displays 134 may include multiple touchscreens. The touchscreen displays include sensors that detect contact by a user or other object with a screen of the touchscreen displays. The touchscreen displays further communicate the coordinates of the contact to controller 120, such as by an electronic signal over interconnect 126. Controller 120 associates the coordinates with a predefined user input and generates appropriate system commands based on the predefined user input. For example, the predefined user input may be associated with an input button displayed at the coordinates on the touchscreen.

The input devices 136 may include trackballs, control sticks, or other suitable cursor control devices for the pilot or crew to communicate with the controller 120. In some embodiments, the input devices 136 are microphones for voice recognition, or may be integrated with the touch capabilities of a touch screen display. It should be appreciated that other input devices 136 may be utilized without departing from the scope of the present disclosure.

FIGS. 2A, 2B, 2C, and 3 illustrate image arrangements 200 and 300 in accordance with some embodiments. Image arrangement 200 includes an avionics status window 212 and image arrangement 300 includes a checklist window 220. In the example provided, image arrangement 200 is displayed in the center of an instrument panel of an aircraft between two Primary Flight Displays. For example, image arrangement 200 may be presented by a large screen or display that replaces traditional Multi-Function Displays. In the example provided, controller 120 generates signals that cause image arrangement 200 to be displayed on the display.

Avionics status window 212 illustrates a status of the condition and state of avionics in the aircraft. Avionics status window 212 includes a system selector portion 232 and a resources portion 230. Resources portion 230 presents the status of various systems and resources associated with the systems. Each of the system types is presented on a different row of plurality of rows 234. Each redundant system is presented in a separate column of plurality of columns 236. The redundant systems utilize different sensors and other sources on aircraft 110. In the event of a system failure of one system, another redundant system may be utilized. For example, the top or first row presents the status of two redundant autopilot systems, "AP 1" and "AP 2." Other systems are represented in resources portion 230, such as the autothrottle systems "AT," the central maintenance fault computer systems "CMF," the radio altimeter systems "RADALT," and so on as will be appreciated by those with ordinary skill in the art. It should be appreciated that the arrangement of the systems in avionics status window 212 may differ without departing from the scope of the present disclosure.

Each box in resources portion 230 is presented with a visual indicator for an electronic circuit breaker status of each of the respective systems. The visual indicators may be colors, shading, fill patterns, box shapes, or any other suitable visual indicators. In the example provided, the visual indicators are colors. For example, a "tripped visual indicator" may be a red color or vertical hatch fill pattern to indicate that the electronic circuit breaker for the respective system or resource exceeded the current limit. A "pulled visual indicator" may be a white color or blank fill pattern to indicate that the electronic circuit breaker associated with the respective resource is pulled. A "collared visual indicator" may be a grey color or a horizontal dashed fill pattern to indicate that the electronic circuit breaker associated with the respective system was collared, such as by maintenance personnel to indicate that the system should not be turned on. A "normal operation visual indicator" may be a green color or backslash fill pattern to indicate that the electronic circuit breaker associated with the respective system is on and functional. It should be appreciated that other fill patterns or other colors may be utilized without departing from the scope of the present disclosure.

In the example provided, a separate "push to set ECBs" button 238 may be selected so that further selection of the resource boxes will change the electronic circuit breaker status of each resource. For example, FIG. 2C illustrates an image arrangement 200A that is generated in response to selection of "push to set ECBs" button 238. In some embodiments, image arrangement 200A may be generated even when image arrangement is not utilized. For example, image arrangement 200A may be generated and presented in response to user selection from a menu or a checklist. Image arrangement 200A presents the resource boxes in a format different from the format of image arrangement 200. The name of the system is presented in each box next to an icon indicating the status of the respective system. For example, Auto Throttles 2 system is illustrated with an "X" icon to indicate that the second Auto Throttles system is collared and not available. It should be appreciated that other visual indicators may be utilized without departing from the scope of the present disclosure.

In some embodiments, no separate "push to set ECBs" button is provided. In such embodiments, selection of the resource boxes (e.g., by pressing the display at the location where the box is displayed) may change the circuit breaker status, or may do nothing without departing from the scope of the present disclosure. In some embodiments, the "pulled visual indicator" and the "collared visual indicator" are only presented after pushing the "push to set ECBs" button. In such embodiments, the "tripped visual indicator" may be displayed for all of the collared and pulled ECBs prior to pushing the "push to set ECBs" button.

To the left of each row is a help button. Selection of the help button triggers presentation of information regarding the normal operations, failure conditions if present, notes from maintenance regarding collared ECBs, or other suitable information associated with the resources. The help button may change based on conditions, as will be appreciated by those with skill in the art.

System selector portion 232 includes a left column and a right column of selectable boxes. Each row of the left and right columns corresponds with a system type from resources portion 230. The left column is associated with the systems feeding information to or otherwise associated with a display or image presented on a left side of the cockpit. Similarly, the right column is associated with the systems feeding information to or otherwise associated with a display or image presented on a right side of the cockpit. The numbers following each system label represent which of these redundant systems is supplying information for the left display and the right display. For example, the left column indicates that the left display is using a first autopilot system, and the right column indicates that the right display is using a second autopilot system.

Upon selection of a box in the left column, the redundant system that feeds the left display changes. For example, selection of the box labeled "AP 1" will change the autopilot system associated with the left display from the first autopilot system to the second autopilot system. The left column will then display "AP 2" to indicate that the second autopilot is associated with the left display. The right column similarly rotates through redundant systems upon selection of a box. It should be appreciated that selection of a box may be made by a cursor or by touch sensing on the display presenting image arrangement 200.

Each of the boxes in the left and right columns has one of three visual indicators to provide similarity and status information. In the example provided, the color of the boxes is the visual indicator. It should be appreciated that other visual cues, such as the shape of the boxes, the fill pattern in the boxes, or any other suitable visual cue may be utilized without departing from the scope of the present disclosure.

Controller 120 changes the visual indicators for each box based on 1) the failure or full operation of the systems and on 2) the similarity or dissimilarity of the systems associated with the left and right displays. When the system selected has failed, regardless of similarity or dissimilarity, controller 120 changes the visual cue of the respective box to a failure visual cue (e.g., red color, vertical hatching, or other distinctive visual cue). Failure visual cue may also be presented when the electronic circuit breaker associated with the system is tripped, collared, or pulled. In the example provided, the "failure visual indicator" is the same as the "tripped visual indicator" from resources portion 230.

When the systems associated with the left column and right column are fully operational and are dissimilar (e.g., "AP 1" for left and "AP 2" for right), controller 120 presents the respective boxes with a "normal operation visual cue" associated with the preferred selection of the systems (e.g., a green color, backslash fill pattern, or other visual cue that is different from the failure visual cue). In the example provided, the "normal operation visual cue" is the same for system selector portion 232 as for resources portion 230. The dissimilar arrangement is the preferred selection so that a failure of one system will impact one of the pilots, and the other of the pilots may take over flight control immediately.

When the systems associated with the left and the right displays are fully operational and similar (e.g., "AT 1" for left and "AT 1" for right), controller 120 presents the respective rows with a "similar visual cue" (e.g., a blue color, a horizontal fill pattern, or other visual cue that is different from the failure and dissimilar visual cues). The similar visual cue indicates that the same systems and sensors are feeding the left and right displays, and that a failure of the selected system will impact both of the pilots.

With reference to FIG. 3, checklist window 220 illustrates a checklist that has the ability to directly control certain items from the checklist itself. For example, each row in checklist window 220 may represent a task to be completed, and a selectable button associated with each row may be presented with status/task labels. The status/task labels are standardized for each task. For example, the labels may be standardized to "DO IT," "CHECK IT," "SET AND AGREE," "SET AS REQ'D," "SET," "DO FLOW," or other similar labels that may each apply to multiple checklists. It should be appreciated that other labels may be used without departing from the scope of the present disclosure.

Checklist window 220 further illustrates merging of multiple checklists by controller 120. When there are multiple non-normal/emergency checklists outstanding, those are merged into one checklist. Multiple events that correspond with checklists may have a common cause or may be independent. For example, in the event of mechanical damage to airplane in which hydraulic and electrical systems are damaged, conventional avionics systems present two separate checklists. In the examples provided, these two separate checklists are merged together and prioritized. For example, when the mechanical damage includes engine failure, controller 120 may present an engine synoptic in the checklist based on common tasks within the electrical, hydraulic, and pressurization checklists that may each be presented separately in conventional systems. In the example provided, where two of checklists include a task to pull the engine fire handle, the tasks are combined into a single checklist to avoid presentation to the pilot more than once.

When no checklists are currently active, controller 120 may present the next checklist based on the current phase of flight and present the next checklist in checklist window 220. As will be appreciated by those with ordinary skill in the art, checklists are typically completed at the start of each flight phase when transitioning from one flight phase to another. For example, checklists may be associated with transition from before engine start to engine start, engine start to taxi, taxi to takeoff, takeoff to climb, etc. Controller 120 is aware of the current flight phase, and may present the next checklist based on the next flight phase. For example, when flying at a cruise altitude and speed, the next phase of flight is typically the descent phase. When no CAS messages associated with a checklist are present, controller 120 may present the descent checklist prior to or upon reaching the descent phase. For example, controller 120 may present the checklist in response to the aircraft reaching a predetermined distance from or reaching a predetermined amount of time from the expected transition to the next consecutive phase of flight. In some embodiments, the checklist is presented in response to reaching the next consecutive phase of flight.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A controller for an aircraft, the controller comprising:
a processor; and
an electronic memory unit communicatively coupled with the processor, the electronic memory unit storing instructions that when executed by the processor enable the controller to:
monitor an operational status of each of a plurality of aircraft systems;
generate, for each of the plurality of aircraft systems, an Electronic Circuit Breaker (ECB) status selector and an operational status visual indicator that indicates the operational status;
generate an image arrangement that includes the operational status visual indicator for each of the plurality of aircraft systems;
replace the operational status visual indicator with the ECB status selector for each of the plurality of aircraft systems in response to selection of a set ECB mode selector; and
generate a signal that causes a display to present the image arrangement.

2. The controller of claim 1, wherein replacing the operational status indicator with the ECB status selector includes arranging each ECB status selector in a same location as the operational status visual indicator for each of the plurality of aircraft systems.

3. The controller of claim 1, wherein the operational status includes an electronic circuit breaker (ECB) status and the operational status visual indicator indicates the ECB status.

4. The controller of claim 3, wherein the controller is further configured to change the ECB status of one of the plurality of aircraft systems in response to a user selection of a corresponding ECB status selector.

5. The controller of claim 3, wherein the controller is further configured to generate at least one of a "normal operation" visual indicator, a "tripped" visual indicator, a "pulled" visual indicator, and a "collared" visual indicator to generate the visual indicator.

6. The controller of claim 3, wherein the controller is further configured to generate "help" buttons in the image arrangement, and wherein the controller is further configured to generate—based on the ECB status of the respective one of the plurality of aircraft systems—one of normal operations information, failure conditions, and maintenance notes regarding collared ECBs.

7. The controller of claim 1, wherein the controller is further configured to monitor a plurality of avionics systems as the plurality of aircraft systems.

8. The controller of claim 1, wherein the controller is further configured to group redundant systems of the plurality of aircraft systems as part of generating the image arrangement.

9. The controller of claim 1, wherein the controller is further configured to generate the visual indicator by selecting a color of a background associated with each of the plurality of aircraft systems.

10. The controller of claim 1, wherein the controller is further configured to generate a system selector portion of the image arrangement, wherein the system selector portion presents information regarding which of the plurality of aircraft systems is in use for displays on a left side of a cockpit of the aircraft and which of the plurality of aircraft systems in in use for displays on a right side of the cockpit.

11. The controller of claim 10, wherein the controller is further configured to indicate in the image arrangement whether systems in use for displays on the right side and on the left side are one of similar, dissimilar, and inoperable.

12. An aircraft instrumentation system, comprising:
a display; and
a controller communicatively coupled with the display, the controller configured to:
monitor an operational status of each of a plurality of avionics systems;
generate, for each of the plurality of avionics systems, an Electronic Circuit Breaker (ECB) status selector and an operational status visual indicator that indicates the operational status;
generate an image arrangement that includes the operational status visual indicator for each of the plurality of avionics systems and groups together redundant systems of the plurality of avionics systems as part of generating the image arrangement;
replace the operational status visual indicator with the ECB status selector for each of the plurality of aircraft systems in response to selection of a set ECB mode selector; and
generate a signal that causes the display to present the image arrangement.

13. The aircraft instrumentation system of claim 12, wherein replacing the operational status indicator with the ECB status selector includes arranging each ECB status selector in a same location as the operational status visual indicator for each of the plurality of aircraft systems.

14. The aircraft instrumentation system of claim 13, wherein the operational status includes an electronic circuit breaker (ECB) status and the visual indicator indicates the ECB status.

15. The aircraft instrumentation system of claim 14, wherein the controller is further configured to change the ECB status of one of the plurality of avionics systems in response to a user selection of the one of the plurality of avionics systems.

16. The aircraft instrumentation system of claim 14, wherein the controller is further configured to generate each operational status visual indicator as one of a "normal operation" visual indicator, a "tripped" visual indicator, a "pulled" visual indicator, and a "collared" visual indicator.

17. The aircraft instrumentation system of claim 14, wherein the controller is further configured to generate the image arrangement in response to a user input associated with setting electronic circuit breakers.

18. The aircraft instrumentation system of claim 14, wherein the controller is further configured to generate "help" buttons in the image arrangement, and wherein the controller is further configured to generate—based on the ECB status of the respective one of the plurality of avionics systems—one of normal operations information, failure conditions, and maintenance notes regarding collared ECBs.

19. The aircraft instrumentation system of claim 12, wherein the controller is further configured to generate the visual indicator by selecting a color of a background associated with each of the plurality of avionics systems.

\* \* \* \* \*